United States Patent [19]

England

[11] Patent Number: 4,728,942

[45] Date of Patent: Mar. 1, 1988

[54] SELF-POWERED ROTATION INDICATOR

[75] Inventor: John F. L. England, North Olmsted, Ohio

[73] Assignee: The Scott & Fetzer Company, Cleveland, Ohio

[21] Appl. No.: 806,699

[22] Filed: Dec. 9, 1985

[51] Int. Cl.⁴ .................... G08B 21/00; H02H 5/04
[52] U.S. Cl. ........................................ 340/679; 361/23
[58] Field of Search ............... 340/679, 671, 648; 324/167, 208, 234; 361/23, 33; 318/490-491; 310/68 B

[56] References Cited

U.S. PATENT DOCUMENTS

| | | | |
|---|---|---|---|
| 3,335,366 | 8/1967 | Byles | 324/167 |
| 4,198,006 | 4/1980 | Rolfe | 340/679 X |
| 4,224,596 | 9/1980 | Knickel | 324/167 X |
| 4,245,370 | 1/1981 | Baker | 361/23 X |
| 4,502,853 | 3/1985 | Ohi | 324/167 X |

Primary Examiner—Glen R. Swann, III
Assistant Examiner—Thomas J. Mullen, Jr.
Attorney, Agent, or Firm—Pearne, Gordon, McCoy & Granger

[57] ABSTRACT

A rotating beater brush contained within a detachable rug cleaning nozzle of a domestic vacuum cleaner carries a rare earth magnet radially spaced from the axis of rotation of the beater brush. Mounted on an interior wall of the nozzle in juxtaposed relationship to the path of the revolving magnet is an iron core coil whose turns are cut by flux derived from the magnet as it moves past the coil, the coil generating an alternating current voltage. A light-emitting diode visible to the user through an aperture in a top wall or ceiling of the nozzle is directly powered by the alternating current voltage provided by the coil wherein the diode illuminates to indicate to the user that the beater brush housed within the nozzle is rotating and has not become jammed or otherwise disabled.

8 Claims, 4 Drawing Figures

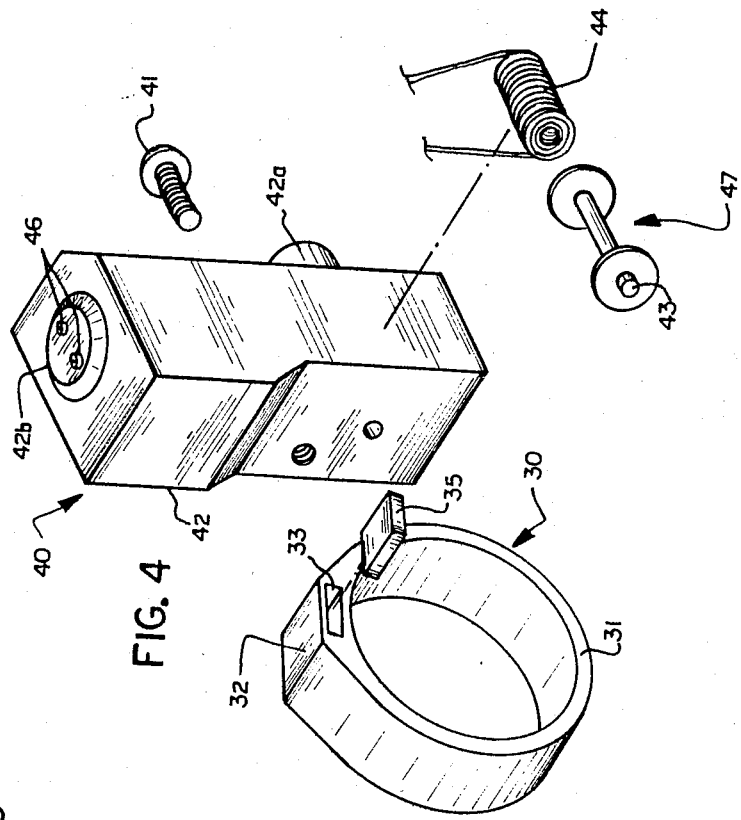
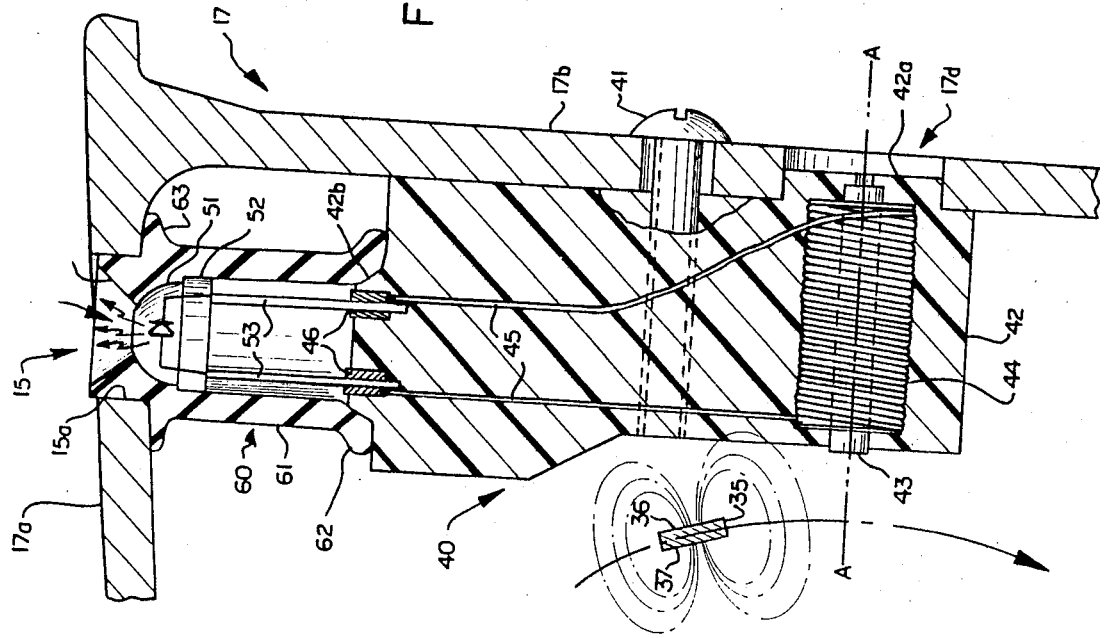

SELF-POWERED ROTATION INDICATOR

BACKGROUND OF THE INVENTION

The present invention relates in general to visual devices for indicating rotation of machine elements normally shielded from direct view by a user. More particularly, the invention is directed to a luminous indicator device that is electrically powered solely by energy derived from the rotating element which the indicator is monitoring. The invention can be used, for example, to provide a self-powered rotation indicator that is mounted within a detachable rug cleaning nozzle of a domestic vacuum cleaner wherein rotation of a beater brush within the nozzle is indicated by illumination of a portion of the indicator viewable by a user.

It is known in the art to provide light-emitting devices for indicating rotation of elements shielded from direct view by a user. U.S. Pat. No. 4,245,370 to Baker discloses such a device.

In the prior art Baker device, a magnet is carried by a rotating beater brush housed within the rug cleaning nozzle of a domestic vacuum cleaner. The magnet revolves about the axis of rotation of the beater brush as it rotates. A Hall effect sensor located adjacent to the path of the revolving magnet provides a pulse signal whose frequency is indicative of the rotational speed of the beater brush. This sensor signal is inputted to a relatively complex, externally-powered, control circuit that performs various functions including illumination of a selected one of a plurality of user viewable light-emitting diodes that indicate the rotational status of the beater brush.

While the prior art Baker device functions to provide a visual indication of the rotational status of a concealed member, i.e. a rug beater brush, its complexity makes it unattractive from a cost and reliability standpoint. There is a need for a rugged and highly reliable rotation indicator that would be self-powered and very low in cost so that it could be easily mounted and wholly contained within a detachable rug cleaning nozzle of a domestic vacuum cleaner, it being recognized that the domestic appliance business is highly competitive.

SUMMARY OF THE INVENTION

In accordance with the present invention, a rotation indicating device is provided for monitoring the rotational status of a member that is mounted within and concealed from view by a housing. For example, the rotating beater brush within the rug cleaning nozzle of a domestic vacuum cleaner can be monitored by the device to indicate to the user that the beater brush is jammed or otherwise disabled wherein corrective action can be taken.

The device comprises a permanent magnet mounted on the rotating member. The magnet is radially spaced from the axis of rotation of the member so that the magnet revolves in a circular path about such axis.

A coil formed from a large plurality of conductor turns is supported by the housing containing the rotatable member. The coil is positioned in juxtaposed relationship to the path of the revolving magnet wherein turns of the coil are cut by magnetic flux derived from the magnet as it moves past the coil wherein the coil generates a voltage. In a preferred form the coil turns are wound about the length of a ferromagnetic core having low residual magnetism, the core improving the efficiency of the voltage generating system comprised by the moving magnet and the coil turns.

A light-emitting means, in the preferred form of a low power light-emitting diode that is readily visible to a user, is electrically connected to the coil and is illuminated solely by the current caused by the noted magnetic flux generated voltage provided by the coil. Illumination of the light-emitting means thus indicates to the user that the member carrying the magnet is rotating within the housing at least to a predetermined degree.

When applied as a rotation indicator for a beater brush rotatably mounted within the rug cleaning nozzle of a domestic vacuum cleaner, the invention preferably includes a coil housing for supporting the coil, and for also supporting, at a top end thereof, a pair of socketlike terminals that are electrically connected to the coil. A base portion of the light-emitting diode has emanating from it a pair of conductor leads, the ends of which plug into the socketlike terminals wherein the coil housing and light-emitting diode constitute a unitary structure that is mounted to a back interior wall of the rug cleaning nozzle. The diode is located immediately below an aperture in the top wall or ceiling of the nozzle so that its luminous portion can be easily viewed via the aperture by a user when the associated vacuum cleaner is operating. A sleevelike sealing member surrounds the base portion of the diode and its conductor leads to shield them from dirt within the rug cleaning nozzle. A collarlike flange at the top end of the sleevelike member sealingly engages a ringlike portion of the housing surrounding the aperture through which the illuminated diode is viewed by the user. Such flange thus precludes undesirable vacuum leaks, i.e. air leaks into the rug cleaning nozzle via the diode viewing aperture. Also, because the noted rotation indicator, comprised primarily of the magnet, coil, and light-emitting diode, is in effect self-contained and self-powered, it can easily be used with a detachable rug cleaning nozzle since there is no need for electrical conductors to extend between the nozzle and the main body of the vacuum cleaner.

BRIEF DESCRIPTION OF THE DRAWINGS

A fuller understanding of the invention may be had by referring to the following description and claims taken in conjunction with the accompanying drawings, wherein:

FIG. 3 is a more detailed cross-sectional view of the rotation indicator wherein a magnet member thereof, illustrated schematically, is moving past a voltage generating coil; and FIG. 4 is an exploded view of the rotation indicator of FIGS. 1-3 in accordance with the present invention.

DETAILED DESCRIPTION OF THE PREFERRED EMBODIMENT

Figure 1:
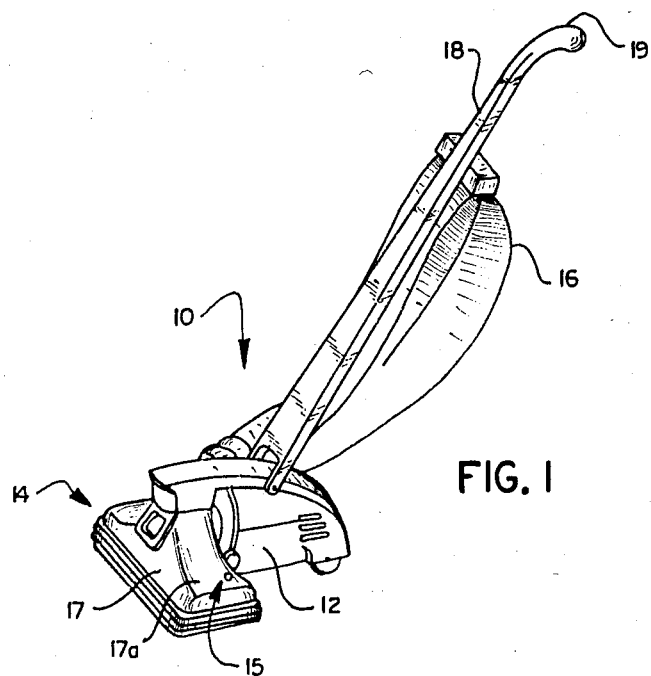
FIG. 1 is a perspective view of a domestic vacuum cleaner having a detachable rug cleaning nozzle containing a beater brush rotation indicator in accordance with the present invention.

With reference to the drawings, FIG. 1 illustrates a domestic vacuum cleaner 10 of the upright type. The vacuum cleaner 10 includes a wheel supported suction motor housing 12 to the front of which is detachably mounted an open bottom rug cleaning nozzle 14. Extending upwardly at an angle from the suction motor housing 12 is an elongated handle structure 18 having its lower end pivotally mounted to the suction motor housing 12 as illustrated, with its upper end carrying a conventional hand grip 19 that is grasped by the user who can then roll the vacuum cleaner 10 back and forth over a surface to be cleaned, such as a rug or carpet. As is well known in the art, a vacuum or suction air flow is created within rug cleaning nozzle 14 by the electrically driven suction motor contained within housing 12, wherein dirt is sucked up into the nozzle 14 through its open bottom, and then conveyed into a conventional dirt collecting bag 16 having its lower end connected to a blower outlet of the housing 12, and its upper end supported at the top end of the handle structure 18 as illustrated. Additional details as to the structure of the vacuum cleaner 10 can be had by reference to U.S. Pat. No. 4,398,316, assigned to the assignee of the present invention, the entirety of which is incorporated herein by reference.

Figure 2:
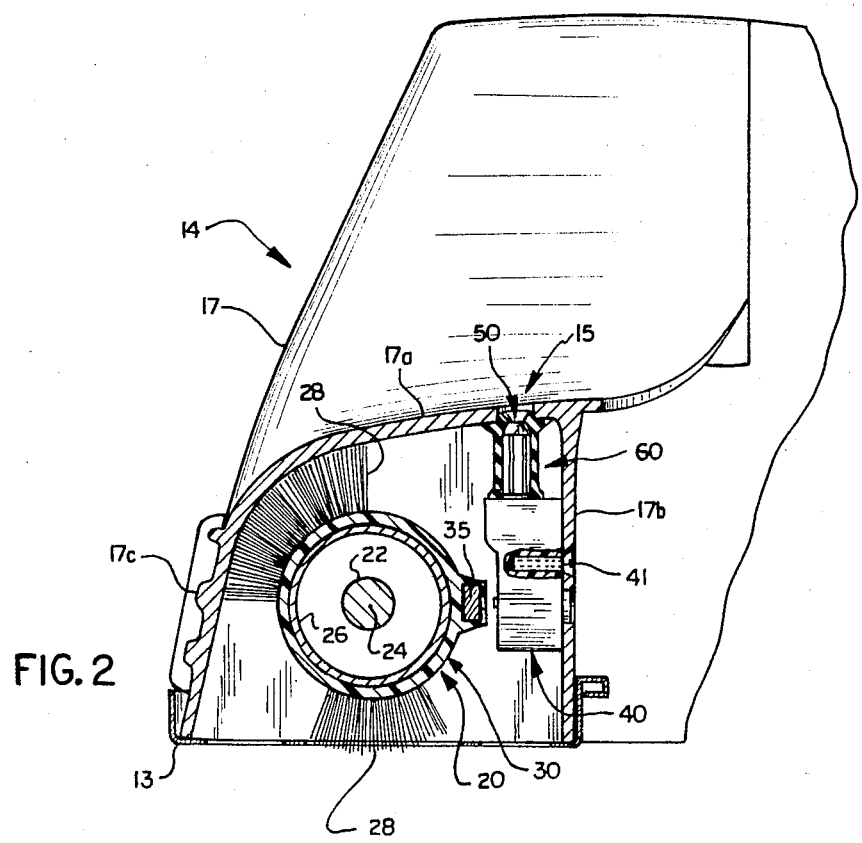
FIG. 2 is a cross-sectional view of the rug cleaning nozzle and the rotation indicator contained therein.

With reference to both FIGS. 1 and 2, the rug cleaning nozzle 14 includes a beater brush housing 17 having a raised middle portion and lower end portions that taper downwardly and outwardly from the raised middle portion as illustrated most clearly in FIG. 1. Located at one end of the nozzle housing 17, in a ceiling or roof portion 17a thereof, is an aperture 15 through which can be viewed a light-emitting portion of a rotation indicator in accordance with the present invention.

As is well known in the art, the rug cleaning nozzle 14 has, rotatably mounted within its housing 17, an elongated beater brush 20 as shown most clearly in FIG. 2. The rotatably mounted beater brush 20 includes a center shaft or spindle 22 that lies along and rotates on an axis of rotation 24. Coaxially mounted on and rotatable with the shaft 22 is a beater brush bristle tube 26 that carries on its outer surface a plurality of rug sweeping bristles 28 that can engage an underlying carpet to be vacuumed via a center aperture in a bottom plate 23 of the nozzle 14, that extends the length of the brush 20. The elongated beater brush 20 is rotatably driven in conventional fashion by an elastomeric belt that loops around the brush 20 and over a drive shaft extending out of the suction motor housing 12, such drive shaft drive belt not being illustrated.

The end of the beater brush 20 closest to that end of the housing 17 providing aperture 15 has mounted upon it a ringlike magnet holder 30 that constitutes one of the elements of the rotation indicator in accordance with the present invention. The ringlike magnet holder, which will be subsequently illustrated in greater detail, carries a permanent rare earth type magnet 35 at a location radially spaced from the axis of rotation 24 upon which the rug beater brush 20 rotates. It can be seen that as the brush 20 rotates at for example a typical speed of 3,000 revolutions per minute, the magnet 35 will revolve in a circular path about the axis 24 in a plane perpendicular to the axis 24.

The beater brush housing 17 includes, as noted earlier, the ceiling or roof portion 17a, a back wall portion 17b and a front wall portion 17c. Mounted to the back wall portion 17b in juxtaposed relation to the circular path of the revolving magnet 35, but in spaced relation thereto, is a coil assembly 40 which is held in position against the back wall portion 17b of the housing 17 by a coil assembly mounting screw 41 is illustrated.

The coil assembly 40 includes a pickup coil, to be subsequently illustrated, which generates an alternating current (AC) voltage pulse each time that the magnet 35 moves past the pickup coil. The AC voltage pulses are provided to a light-emitting means in the preferred form of a light-emitting diode 50, mounted on top of housing 40, whose top luminous portion is visible, from outside the housing 17 via the aperture 15 in the ceiling portion 17a as illustrated. A bootlike elastomeric sleeve member 60 functions to seal the diode 50 and its connection junction to the coil assembly 40 from dirt within the nozzle housing 17, and also serves to seal in an air tight manner the diode 50 in position within the aperture 15 so that air will not leak into the vacuum created within nozzle 14.

It has been found that, with the rotation indicator assembly illustrated in FIG. 2, for a brush rotation speed of approximately 3,000 rpm, light-emitting diode 50 will illuminate wherein a user by looking down at the top or ceiling portion 17a of the housing 17 can clearly see such illumination of the diode thereby indicating that brush 20 is rotating at an acceptable rate within the nozzle 14. If for example the brush should jam or the belt driving such brush should break, rotation of the brush 20 will stop wherein the voltage output of coil assembly 40 will no longer exist and the light output of the diode 50 will cease thereby indicating to the user that a disabled beater brush condition exists wherein corrective action can be taken. It is also to be noted that the belt driving the beater brush may slip wherein the brush will rotate at a lower than optimum speed, e.g. 1,000 rpm. Under such belt slipping conditions, the frequency of voltage pulses and their amplitude will be decreased to the point where the light output of the diode will flicker. Such a flickering indicator light condition alerts the user to an undersirable belt slipping condition wherein corrective action can be taken.

With further reference to FIG. 2, the ringlike magnet holder 30 with its magnet 35, and the coil assembly 40 with its associated light-emitting diode 50 and sleevelike ceiling member 60, constitute a rugged rotation indicating device completely contained within nozzle 14. Detachment and reattachment of the nozzle 14 can be easily effected by conventional mechanical means since there are no electrical connections between the nozzle 14 and associated suction motor housing 12 (see FIG. 1).

A more complete understanding of the structure and operation of the self-powered rotation indicator in accordance with the present invention can be had by reference to FIGS. 3 and 4. With particular reference to FIG. 4, the ringlike magnet holder 30 that is press fitted over the cylindrical end of the beater brush bristle tube 26 (see FIG. 2) is formed of a nonmagnetic material such as injection molded nylon or other suitable plastic. The holder 30 includes an annular mounting ring 31 having a circular inner peripheral surface which fits over the end of the beater brush 20 (FIG. 2) as discussed earlier. The outer surface of the annular beater brush ring 31 includes a raised portion 32 that is integrally formed as a part of the magnet holder 30 as illustrated. This raised portion 32 includes a pocket 33 having one open end as illustrated, and into which is press fitted the permanent, rare earth type magnet 35. A magnet that is one quarter inch square, having a thickness of approximately one tenth of an inch, formed from cobalt solarium for example, has been successfully used in practicing the invention. Such magnetic material is available from Hitachi Magnetics Corporation of Edmore, Michigan which is a division of Hitachi Metal International Limited of Japan. With the magnet 35 press fitted into its associated pocket 33 and with the mounting ring 31 press fitted over, and in effect locked in position on the end of the beater brush 20, the beater brush 20 and the ringlike magnet holder 30 carrying magnet 35 comprise a unitary structure that can withstand the normal 3,000 rpm rotational speed of the beater brush 20.

With particular reference to FIG. 3, the magnet 35 is illustrated in schematic fashion apart from its holder 30 and can be seen to follow an arcuate path as it passes by the coil assembly 40 at a point spaced therefrom, i.e. a point radially inwardly from the assembly 40 relative to the axis of rotation 24 about which the magnet rotates. The magnet 35 includes a first pole face 36, and an opposed second pole face 37 facing inwardly toward the axis of rotation 24 (FIG. 2). For example, the face 36 could be a north magnetic pole with face 37 being a corresponding south magnetic pole. Conversely, face 36 could be a south pole with face 37 being a corresponding north pole 30. The pole faces 36 and 37 interchange magnetic flux as illustrated and as is well known in the art. Such magnet 35 with its associated magnetic flux will revolve about the axis of rotation 24 (FIG. 2) the beater brush 20 in a plane that is perpendicular thereto as discussed earlier.

With reference to FIG. 3, the coil assembly 40, held in position against the back wall portion 17b, of nozzle housing 17, can be seen to include a casing 42 formed for example a molded phenolic type plastic. The casing 42 is molded as as to encapsulate within it a pickup coil constituted by a ferromagnetic core 43 that extends along an axis AA that intersects the axis of rotation 24 of the beater brush 20 (FIG. 2), the axis AA also lying in the plane of rotation of the magnet 35. Wound about and along the length of the ferromagnetic core 43 are a large plurality of coil turns 44. For example, in practicing the present invention, approximately 2,000 turns of a No. 40 gauge enamelled wire are wound about a bobbin 47 (FIG. 4) which is then slipped over the core 43 as illustrated, the resulting cylindrical coil with the core 43 therein having a length of approximately one half inch, and a diameter of approximately one quarter inch. The coil turns 44 are formed from a single piece of wire having its ends connected to a pair of socketlike terminals 46 by means of connecting leads 45 extending between the coil turns 44 and the socketlike terminals 46 which are located and anchored in an upper raised end 42b of the casing 42 (also see FIG. 4).

A protruding cylindrical locating stud 42a extends from the lower back portion of the housing 42 and is received in a locator aperture 17d provided in the back wall portion 17b of the housing 17, such locator stud 42a serving to preclude rotation of the housing 42 on the axis of screw 41 wherein the housing 42 is solidly anchored and fixed to the back wall portion 17b.

It can be seen that the coil turns 44 mounted on the ferromagnetic core 43 with connecting leads 45 and socketlike terminals 46 are all embedded within and encapsulated by the phenolic plastic material constituting the casing 42 so as to provide a rugged and durable coil assembly 40. It can further be seen that the front or leftward end of the core 43, as viewed in FIG. 3, extends or projects slightly from the front of the housing 42 so that it is at the closest point to the path of the revolving magnet 35. As will be recognized in the art, as the magnet 35 moves past the exposed end of core 43 the flux of the magnet will engage the core 43 which will in effect conduct it so that flux derived from the magnet 35 will emanate from the length of the core 43 to cut the turns of the pickup coil to generate a positive voltage spike. As the magnet 35 moves away from the exposed end of the core 43, the magnetic field established via core 43, which in itself temporarily acts as a magnet, will collapse to again cut the turns 44 to generate an opposed or negative voltage spike. Thus, a cycle of alternating current voltage, i.e. a positive voltage spike followed by negative voltage spike, or vice versa depending upon the north-south polarity of the magnet 35, is generated each time the magnet 35 moves past the exposed end of the core 43 as illustrated most clearly in FIG. 3. In practice, the magnet holder 32, containing the magnet 35, is spaced approximately one quarter of an inch from the exposed end of the core 43 so as to allow enough space for dirt to pass between such members and/or to allow a certain amount of dirt build up without the exposed end of the core 43 engaging the moving magnet pocket holder 32 so as to brake the rotating brush 20.

With further reference to FIG. 4, the diode 50 includes a light-emitting top or cap 51 supported by a base 52 from which downwardly extends or emanates a pair of electrically conductive leads 53. A suitable light-emitting diode for use in practicing the present invention is manufactured and sold by Hewlett-Packard of Palo Alto, California and is designated as a type HLMP3568 diode. The distal ends of the leads 53 plug into the socketlike terminals 46 provided on a raised top end portion 42b of the casing 42 as illustrated. The sleevelike sealing member 60 can be seen to include a main body tube 61, having a lower end 62, a conelike upper end flange 63, and an annular shoulder 64. The sleevelike sealing member 60 is preferably formed of a flexible elastomeric material. With particular reference to FIG. 3, it can be seen that the lower end 62 of the main body tube 61 is sized to fit over the top end 42b of the casing 42 in a sealing, generally air tight fashion. The inner upper portion of the main body tube 61 receives in a sealing manner the base portion 52 so as to support the light emitting portion 51 of the diode 50 in position relative to the viewing aperture 15. It can be seen that a ring-like aperture wall 15a defining aperture 15 is engaged by the outer side of the annular shoulder 64 which is sized to fit into the aperture 15 while the upper side of the conelike flange flexes against and sealingly engages the housing portion surrounding the aperture 15 as illustrated. The sleevelike sealing member 61 is slightly compressed between the underside of the ceiling or roof portion 17a and the upper end 42b of the coil assembly casing 42 so that it tightly engages both such upper end 42b and the underside of the ceiling 17a wherein air flow into the nozzle housing 17 via the aperture 15 is precluded since the upper end of the sealing member 60 sealingly engages both the diode 50 and the aperture wall 15a. Also, it can be seen that the base portion of the diode with its lead 53 are sealed within the interior of the sealing member 60 against dirt within the nozzle housing 17.

It can be seen that a relatively simple device has been provided for indicating rotation of the beater brush located within the nozzle housing. In practicing the invention with the particular components set forth above, with the brush rotating at its normal 3,000 rpm speed, 3,000 pulses or cycles of alternating current voltage are applied to the diode 50 at a level of approximately 425 millivolts. A rectified portion of each AC voltage pulse lights the diode to thus indicate to the user that the brush 20 is rotating in an acceptable manner. The rotation indicator structure as discussed above is simple in design and low in cost and has been found to be very rugged in practice.

Although the preferred embodiment of this invention has been shown and described, it should be understood that various modifications and rearrangements of the parts may be resorted to without departing from the scope of the invention as disclosed and claimed herein.

What is claimed is:

1. In a device having a rotating member contained at least partially within a housing so that the rotating member is obscured from direct view by a user when the device is in a normal operating position, a rotation indicating device comprising:

a permanent magnet mounted on the rotating member, the magnet being radially spaced from the axis of rotation of the member, the magnet revolving in a circular path about said axis, said revolving occurring in a plane perpendicular to said axis of rotation, said magnet having a north pole face and an opposed south pole face, one of said pole faces facing inwardly toward said axis of rotation, the other of said pole faces facing outwardly from said axis of rotation;

a coil having an elongated ferromagnetic core lying along a center axis coinciding with a line extending radially from said axis of rotation, said line extending in said plane, said coil including a large plurality of conductor turns wound about and along the length of said core, said coil being cylindrically shaped, one end of said cylindrically shaped coil being mounted on said housing and being positioned adjacent to the said circular path of said revolving magnet wherein magnetic flux derived from said magnet cuts the turns of said coil as the magnet moves past said one end of said cylindrically shaped coil, wherein said coil generates a cycle of alternating current voltage each time said magnet passes by said one end of the cylindrical coil; and a light-emitting diode mounted on said housing and readily visible to said user, the light-emitting diode being electrically connected to the coil and being illuminated solely by a rectified portion of cycles of said alternating current voltage.

2. A rotation indicating device according to claim 1, wherein said device includes non-magnetic holder means fixed to said rotating member to retain the magnet in position on said rotating member.

3. A rotation indicating device according to claim 1, wherein said housing contains said magnet, said coil, and said light-emitting diode, said housing including an aperture in a wall portion thereof, said diode being positioned within said housing so that a user can readily view said diode through said aperture.

4. A rotation indicating device according to claim 3, including sealing means extending between said diode and a portion of said housing extending around said aperture, wherein said sealing means generally precludes air flow through said aperture.

5. A rotation indicating device according to claim 4, wherein said sealing means is formed of elastomeric material.

6. A rotation indicating device according to claim 3, wherein said coil is mounted within a coil housing which in turn is mounted to an interior wall portion of said housing for said rotating member, said coil housing supporting a pair of socketlike connectors electrically connected to the turns of said coil, said diode having a pair of electrically conductive leads which have ends that are plugged into said socketlike connectors, wherein said coil housing and said diode form a unitary structure.

7. A rotation indicating device according to claim 3, including an elastomeric sleevelike member that slips over and about said diode and its said conductive leads, a lower portion of the sleevelike member sealingly engaging that protion of the coil housing supporting said socketlike connectors, an upper portion of the sleevelike member sealingly engaging a base portion of said diode from which said conductive leads emanate, wherein said leads and said connectors are generally sealed in air tight fashion within said sleevelike member.

8. A rotation indicating device according to claim 7, wherein said sleevelike member provides at its upper end a collarlike flange of elastomeric material that sealingly engages a ringlike portion of the housing, said ringlike portion extending about the periphery of said aperture wherein air flow through the aperture into the housing is precluded, a top luminous portion of the diode being viewable from outside the housing via said aperture.

* * * * *